Patented May 23, 1950

2,508,422

UNITED STATES PATENT OFFICE 2,508,422

QUATERNARY AMMONIUM HALIDES OF AMINO BENZHYDRYL ETHERS

George Rieveschl, Jr., Grosse Pointe Woods, Mich., assignor to Parke, Davis & Company, Detroit, Mich., a corporation of Michigan No Drawing. Application January 11, 1946, Serial No. 640,686

4 Claims. (Cl. 260—293)

This invention relates to new quaternary ammonium halides and to methods for obtaining the same. This application is a continuation-in-part of my application, Serial No. 531,639, filed April 18, 1944 from which Patent No. 2,421,714 was issued June 3, 1947. More particularly, the invention relates to compounds of the general formula.

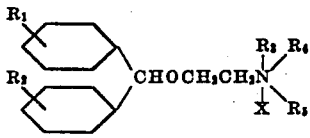

where $R_1$ and $R_2$ are the same or different substituents and represent hydrogen, an alkyl radical containing 1 or 2 carbon atoms or an alkoxy radical containing 1 or 2 carbon atoms, $R_3$ and $R_4$ are the same or different alkyl radicals containing 1 to 3 carbon atoms inclusive or $R_3$ and $R_4$ taken with —N< may be a saturated six-membered heterocyclic ring such as piperidine, a methyl substituted piperidine, morpholine, a methyl substituted morpholine, thiomorpholine and the like, $R_5$ is an alkyl radical of 1 to 5 carbon atoms inclusive or an aralkyl radical and X is a chlorine, bromine or iodine atom.

I have found that the compounds of the present invention may be prepared in yields of about 90 to 100% by the reaction of a β-haloethyl benzhydryl ether compound of the formula,

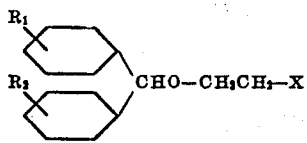

with a tertiary amine of the formula,

where $R_1$, $R_2$, $R_3$, $R_4$, $R_5$ and X have the same significance as given above.

The reaction is preferably carried out in an inert organic solvent. Some examples of the solvents which I have found to be suitable as reaction mediums are ether, chloroform, carbon tetrachloride, benzene, toluene, xylene, methanol, ethanol, isopropanol, n-propanol, acetone, ethyl acetate, acetonitrile, nitromethane and the like. In most instances the product separates from the reaction mixture in crystalline form and requires little or no further purification. However, when an alcohol such as methanol, ethanol, isopropanol and the like is used as a solvent, the reaction product is soluble in the solvent if too much solvent has been used. In this case the product may either be crystallized directly from the reaction mixture by evaporation of some of the solvent or it may be precipitated from the reaction mixture by the addition of another solvent in which the product is insoluble, e. g. ether, acetone, chloroform, ethyl acetate and the like.

I have found that, in most cases, the application of heat to the reaction mixture is not necessary in order to bring about the reaction. However, in most instances heat may advantageously be employed to hasten the reaction or to insure the completion of the reaction.

The compounds of the present invention are powerful antihistamine agents. They are also useful in preventing smooth muscle spasms induced by histamine, acetyl choline or barium chloride. Another property of these compounds is that they inhibit gastric secretion which has been induced by meal or histamine stimulus. These new compounds may be administered orally, rectally, parenterally, or as a vapor or mist. These compounds find particular use in humans for treatment of allergic conditions (asthma, urticaria, histamine cephalagia and anaphylactic shock) and smooth muscle spasms (biliary spasms and dysemenorrhea). For example, the compound shown in Example 1, β-benzhydryloxyethyl trimethylammonium chloride, may be administered to humans orally in a dosage of 25 to 150 mg. per day and intravenously in a dosage of 5 to 30 mg. per day. However, because of the high activity of this compound and the other compounds of this invention, it has been found that a dosage of 50 mg. per day orally or 10 mg. per day by the intravenous route is usually sufficient in the treatment of smooth muscle spasms and most allergic conditions.

The invention is illustrated by the following examples.

*Example 1.—β-Benzhydryloxyethyl trimethylammonium bromide*

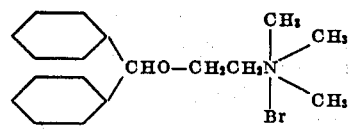

146.5 g. of β-bromoethyl benzhydryl ether is added to a solution consisting of 100 ml. of 33% aqueous trimethylamine and 50 ml. of isopropanol and the mixture shaken for six days. The isopropanol, excess trimethylamine and water are removed from the clear solution by distillation in vacuo and the residue treated with 20 ml. of isopropanol. The mixture is diluted with ether, the product collected and purified by recrystallization from isopropanol; M. P. 193–5° C.

By using an equivalent amount of β-chloroethyl benzhydryl ether in the above procedure instead of the corresponding bromo compound, one obtains β-benzhydryloxyethyl trimethyl ammonium chloride; M. P. 176–9° C. and by using β-iodoethyl benzhydryl ether, β-benzhydryloxyethyl trimethyl ammonium iodide; M. P. 192–3° C.

*Example 2.—β-Benzhydryloxyethyl diethyl-n-butylammonium bromide*

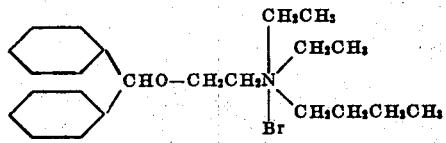

A mixture consisting of 281 g. β-bromoethyl benzhydryl ether and 130 g. of diethyl-n-butylamine in 1 liter of toluene is refluxed for four hours. The mixture is cooled and the product removed by filtration. The crude product is purified by recrystallization from isopropanol.

In a similar manner, by using triethylamine instead of diethyl-n-butylamine in the above procedure, one obtains β-benzhydryloxyethyl triethylammonium bromide; M. P. 146–8° C.

*Example 3.—1-(β-benzhydryloxyethyl)-1-methylpiperidinium iodide*

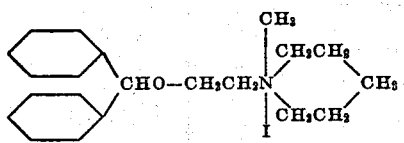

338 g. of β-iodoethyl benzhydryl ether dissolved in 500 cc. of benzene is added slowly with stirring to a solution of 100 g. of N-methylpiperidine in 500 cc. of benzene. After all the halide has been added, the mixture is stirred for two days and then the product collected and purified by recrystallization from methanol-isopropanol mixture; M. P. 181–2° C.

1-(β - benzhydryloxyethyl) - 1 - methylpiperidinium bromide may be prepared in a similar manner to that described above by using an equivalent amount of β-bromoethyl benzhydryl ether instead of β-iodoethyl benzhydryl ether.

By using an equivalent amount of 1,3-dimethylpiperidine instead of N-methylpiperidine in the above procedure 1-(β-benzhydryloxyethyl)-1,3-dimethylpiperidinum iodide is obtained.

*Example 4.—4-(β-benzhydryloxyethyl)-4-methylmorpholinium bromide*

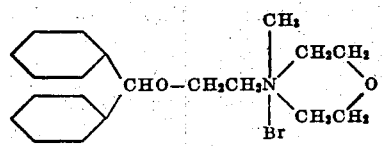

A mixture consisting of 87.3 g. of β-bromoethyl benzhydryl ether and 50 g. of 4-methylmorpholine is heated for two hours, at the end of which time the mixture is turbid. 100 ml. of isopropanol is added and the mixture refluxed for two hours, cooled and the product precipitated by the addition of ether. The product is collected and purified by recrystallization from isopropanol-ether mixture; M. P. 187–88° C.

4-(β - benzhydryloxyethyl) - 4 - methylmorpholinium iodide may be prepared by following the above procedure and using an equivalent amount of β-iodoethyl benzhydryl ether instead of β-bromoethyl benzhydryl ether; M. P. 205–6° C.

*Example 5.—β-4,4'-dimethylbenzhydryloxyethyl di-n-propylisopropylammonium bromide*

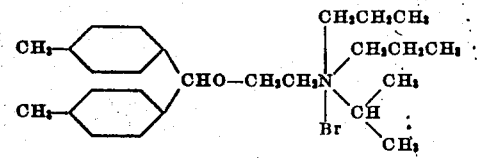

A mixture consisting of 319 g. of β-bromoethyl p,p'-dimethyl benzhydryl ether and 145 g. of di-n-propylisopropylamine in 1 liter of xylene is refluxed for four hours, cooled and the white precipitated product removed by filtration. The product is washed with dry ether and purified by recrystallization from isopropanol-ether mixture.

*Example 6.—β-2-methoxybenzhydryloxyethyl methylethylbenzylammonium chloride*

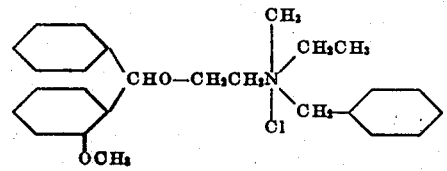

A mixture consisting of 276 g. of β-chloroethyl 2-methoxybenzhydryl ether and 150 g. of methylethylbenzylamine in 1 liter of toluene is refluxed for six hours. The mixture is cooled, the precipitated product collected and purified by recrystallization from isopropanol.

The various β-halogenethyl ether compounds used as starting materials for the preparation of these new compounds may be prepared by the same general method as that described below for the preparation of β-bromoethyl benzhydryl ether.

494 parts by weight of benzhydryl bromide, 206 parts anhydrous sodium carbonate and 313 parts of ethylene bromohydrin are heated and stirred at 120–30° C. for eight hours. Carbon dioxide is evolved during the reaction. 500 parts of benzene are added with stirring, the precipitate filtered off and washed with benzene. The benzene is removed by distillation and the residual β-bromoethyl benzhydryl ether purified by distillation in vacuo; B. P. 169–72° C./2 mm.

Attention is called to the following copending applications which are somewhat related: Serial No. 640,685, filed January 11, 1946; Serial No. 640,687, filed January 11, 1946; Serial No. 660,406, filed April 8, 1946, now Patent 2,483,434; Serial No. 688,420, filed August 5, 1946; Serial No. 688,421, filed August 5, 1946; Serial No. 688,422, filed August 5, 1946; Serial No. 688,423, filed August 5, 1946; Serial No. 688,424, filed August 5, 1946, now Patent 2,453,729; Serial No. 688,425, filed August 5, 1946, now Patent 2,483,435; Serial No. 688,426, filed August 5, 1946; Serial No. 688,427, filed August 5, 1946, now Patent 2,483,-436; Serial No. 739,985, filed April 8, 1947, now Patent 2,427,878; Serial No. 751,983, filed June 2, 1947, now Patent 2,454,092; Serial No. 751,984, filed June 2, 1947, now Patent 2,483,671; Serial No. 751,985, filed June 2, 1947, now Patent 2,455,-949; Serial No. 780,099, filed October 15, 1947; Serial No. 15,257, filed March 16, 1948; and Serial No. 33,432, filed June 16, 1948.

What I claim as my invention is:

1. A compound of the formula,

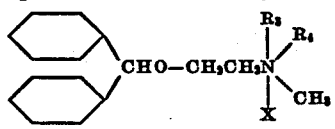

where R₃ and R₄ taken with —N< form a piperidine ring and X is a member of the class consisting of chlorine, bromine and iodine.

2. A compound of the formula,

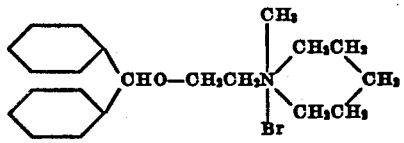

3. A compound of the formula,

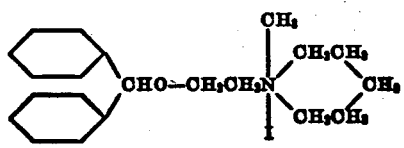

4. A compound of the formula,

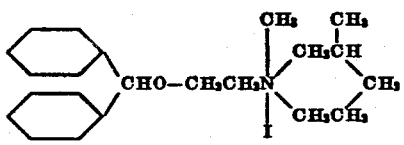

GEORGE RIEVESCHL, Jr.

REFERENCES CITED

The following references are of record in the file of this patent:

UNITED STATES PATENTS

| Number | Name | Date |
|---|---|---|
| 2,044,099 | Piggott et al. | June 16, 1936 |
| 2,087,131 | Taub | July 13, 1937 |
| 2,202,864 | Piggott et al. | June 4, 1940 |
| 2,397,799 | Martin et al. | Apr. 2, 1946 |